(12) United States Patent
Suematsu et al.

(10) Patent No.: US 7,851,097 B2
(45) Date of Patent: Dec. 14, 2010

(54) FUEL CELL SYSTEM

(75) Inventors: Keigo Suematsu, Susono (JP); Tatsuaki Yokoyama, Susono (JP); Shuji Hirakata, Susono (JP); Takahide Izutani, Susono (JP); Atsushi Matsuba, Mishima (JP); Katsuhiko Oshikawa, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 441 days.

(21) Appl. No.: 11/889,164

(22) Filed: Aug. 9, 2007

(65) Prior Publication Data

US 2008/0226957 A1   Sep. 18, 2008

(30) Foreign Application Priority Data

Aug. 9, 2006   (JP) .............................. 2006-216651
Aug. 23, 2006  (JP) .............................. 2006-226773

(51) Int. Cl.
   *H01M 8/04* (2006.01)
(52) U.S. Cl. ........................................ 429/428; 429/433
(58) Field of Classification Search .................. 429/22, 429/34, 23, 33, 19, 428, 452
See application file for complete search history.

(56) References Cited

U.S. PATENT DOCUMENTS

| 2001/0016276 A1* | 8/2001 | Yamanashi .................... 429/22 |
| 2004/0013917 A1* | 1/2004 | Ukai et al. .................... 429/19 |
| 2004/0072051 A1* | 4/2004 | Murata et al. ................. 429/34 |

FOREIGN PATENT DOCUMENTS

| JP | 2004-134272 | 4/2004 |
| JP | 2004-134273 | 4/2004 |

* cited by examiner

*Primary Examiner*—Jonathan Crepeau
*Assistant Examiner*—Kenneth Douyette
(74) *Attorney, Agent, or Firm*—Finnegan, Henderson, Farabow, Garrett & Dunner, LLP

(57) ABSTRACT

The present invention provides a technology related to a fuel cell system capable of adjusting a discharge amount of an odorant discharged to an outside of a moving body according to a state of the moving body. The fuel cell system mounted to a moving body includes: a fuel cell which generates electric power by electrochemically reacting a hydrogen gas with an oxidation gas; and a adjusting portion which adjusts an amount of an odorant to be discharged to an outside of the moving body according to a state of the moving body, the odorant being included in an anode off-gas discharged from an anode side of the fuel cell.

4 Claims, 8 Drawing Sheets

F I G. 1
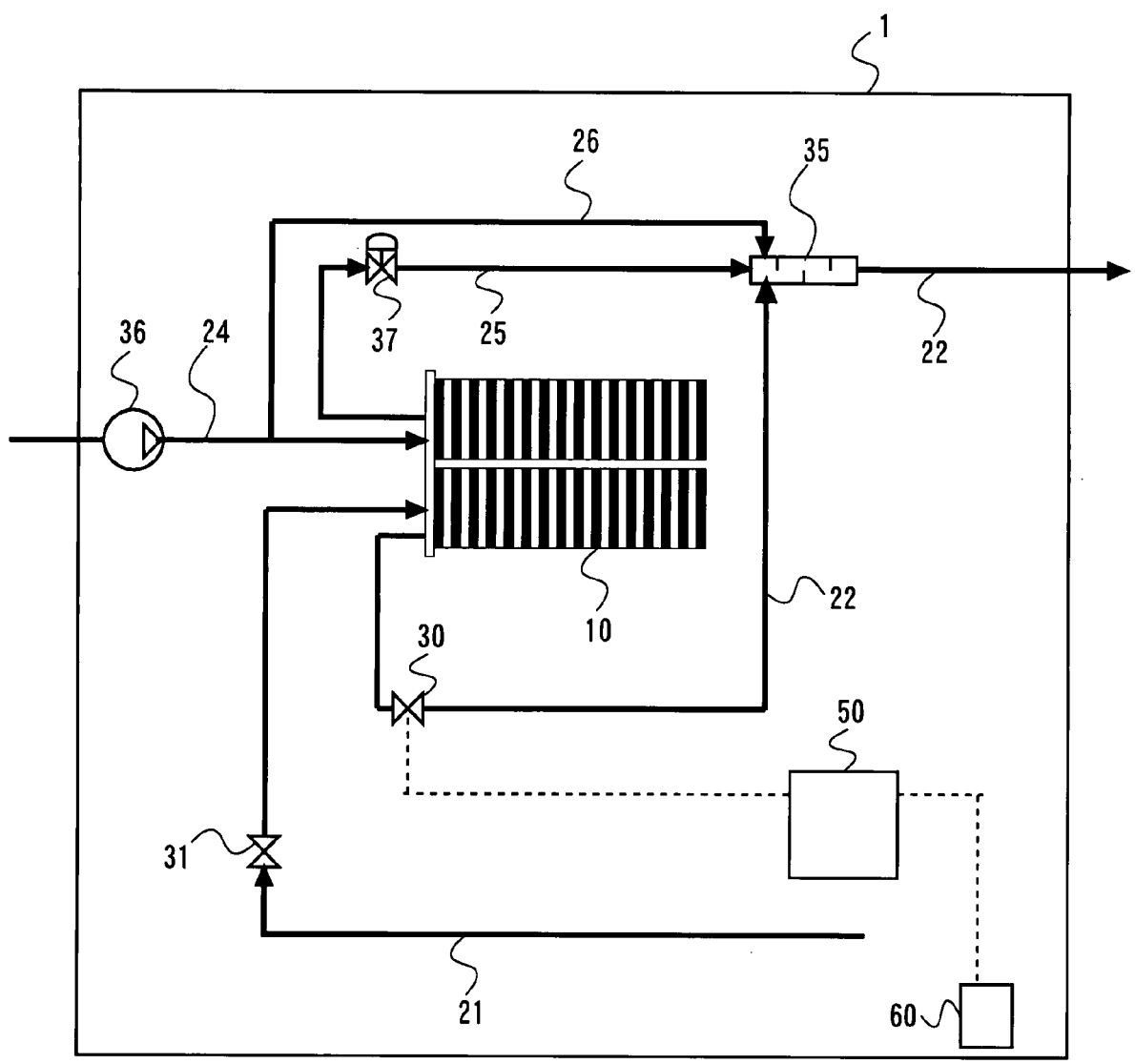

FUEL CELL SYSTEM

BACKGROUND OF THE INVENTION

1. Field of the Invention

The present invention relates to a fuel cell system.

2. Description of the Related Art

A fuel cell system performs power generation by electrochemically reacting a hydrogen gas with an oxidation gas. The hydrogen gas serving as a fuel of the fuel cell system is a gas which is colorless and odorless. An odorant is added to the hydrogen gas which is colorless and odorless to detect leakage of the hydrogen gas. However, the odorant is not consumed in the fuel cell, so the odorant remains to be included in exhaust air discharged from the fuel cell, thereby generating smell in some cases.

As a technology of removing the odorant added to the hydrogen gas, there is known a technology as disclosed in JP 2004-134273 A, for example. JP 2004-134273 A discloses a technology related to an odorant removing portion including an adsorbent for adsorbing the odorant and a catalyst for promoting decomposition of the adsorbed odorant. Further, JP 2004-134272 A discloses a technology of adsorbing the odorant by the odorant eliminating portion and reproducing adsorption property of the odorant elimination portion.

SUMMARY OF THE INVENTION

By providing the odorant eliminating portion to the fuel cell system, the odorant included in the exhaust air can be eliminated. On the other hand, when a moving body such as a vehicle travels at a speed equal to or higher than a predetermined moving speed, the odorant included in the exhaust air can be diluted by airflow around the moving body with respect to the moving body such as travel wind. However, when the moving body travels at a speed equal to or lower than the predetermined moving speed, in particular, when the moving body is in a stopped state, the dilution by the travel wind cannot be performed. Therefore, there is a demand for development of a technology capable of reducing the odorant discharged to an outside of the moving body even in a case where the dilution by the airflow around the moving body with respect to the moving body cannot be expected.

Further, by providing a physical adsorbent such as activated carbon to the fuel cell system, the odorant included in the exhaust air can be adsorbed. The adsorbed odorant can be released by raising temperature of the physical adsorbent. As a result, the adsorption property of the physical adsorbent can be reproduced. When, for example, the vehicle travels at a speed equal to or higher than a predetermined speed, the odorant released at the time of reproduction can be diluted by the travel wind. However, when the vehicle travels at a speed lower than the predetermined speed, the dilution by the travel wind cannot be performed sufficiently. Under the conditions in which the dilution cannot be performed sufficiently, when the odorant adsorbed by the physical adsorbent is released, the reproduction of the adsorption property of the physical adsorbent can be achieved, but smell is generated.

In view of the above-mentioned problems, it is an object of the present invention to provide a technology related to a fuel cell system capable of adjusting a discharge amount of an odorant discharged to an outside of a moving body according to a state of the moving body. Specifically, it is another object of the present invention to provide a technology related to a fuel cell system capable of reducing a odorant discharged to an outside of a moving body when the moving body is in a stopped state or in a low-speed traveling state. Further, it is still another object of the present invention to provide a technology related to a fuel cell system capable of achieving reproduction of adsorption property of odorant adsorbing portion adsorbs an odorant included in an anode off-gas and suppressing generation of smell by controlling a timing of releasing the adsorbed odorant.

In order to achieve the above-mentioned objects, the present invention adopts the following means. That is, there is provided a fuel cell system mounted to a moving body, including: a fuel cell which generates electric power by electrochemically reacting a hydrogen gas with an oxidation gas; and a adjusting portion which adjusts an amount of an odorant to be discharged to an outside of the moving body according to a state of the moving body, the odorant being included in an anode off-gas discharged from an anode side of the fuel cell. According to the present invention, with the above-mentioned structure, the discharge amount of the odorant discharged to the outside of the moving body can be adjusted according to the state of the moving body.

An example of the state of the moving body includes a traveling state. When the moving body is in a stopped state or a low-speed traveling state, the dilution by the airflow around the moving body with respect to the moving body cannot be expected. Accordingly, it is desirable that the odorant discharged to the outside of the moving body can be reduced. In this case, the fuel cell system according to the present invention is mounted to a moving body and includes: a fuel cell which generates electric power by electrochemically reacting a hydrogen gas with an oxidation gas; an anode off-gas path which has one end connected to the fuel cell and another end communicating with outside air and through which an anode off-gas including an odorant discharged from an anode side of the fuel cell flow; and anode off-gas flow rate adjusting portion which shuts off the flow of the anode off-gas in the anode off-gas path or reduces a flow rate of the anode off-gas compared to a flow rate of the anode off-gas in a normal state in a case where a moving speed of the moving body is lower than a predetermined moving speed.

The fuel cell performs the power generation by electrochemically reacting the hydrogen gas with the oxidation gas. The odorant is added to the hydrogen gas (fuel gas), thereby making it possible to detect leakage of the hydrogen gas. The hydrogen gas added with the odorant is supplied to the anode side of the fuel cell. The anode off-gas is discharged from the anode side. The anode off-gas path communicates with an outside air. The anode off-gas discharged from the anode side flows through the anode off-gas path to be finally discharged to the outside of the fuel cell system. The fuel cell can be mounted as a drive source for movement to the moving body. Examples of the moving body include an automobile, a two wheeler, a vehicle such as a railway vehicle, and a robot which can move by itself.

The fuel cell system according to the present invention is characterized by including the anode off-gas flow rate adjusting portion which adjusts a flow rate of the anode off-gas according to a moving speed of the moving body. The anode off-gas adjusting portion can reduce the flow rate of the anode off-gas in the anode off-gas path compared to that in the normal state, when a moving speed of the moving body on which the fuel cell system is mounted is lower than the predetermined moving speed. As a result, when the moving body is in the stopped state or the low-speed traveling state, a discharge amount of the anode off-gas to the outside of the moving body is reduced, thereby also reducing a discharge amount of the odorant included in the anode off-gas to the outside of the moving body. Note that, the reduction compared to the normal state means that the flow rate is reduced compared to the flow rate of the anode off-gas discharged when the moving body travels at a speed equal to or higher than the predetermined moving speed. The moving speed of the moving body can be detected by, for example, speed detecting portion detecting the moving speed of the moving body. The speed detecting portion is preferably a device for measuring the moving speed of the moving body with respect to a ground, like a ground speed sensor.

The predetermined moving speed is a moving speed at which the dilution by the airflow around the moving body with respect to the moving body, for example, the travel wind, cannot be expected. The predetermined moving speed can be appropriately set. Further, a case where the moving speed is lower than the predetermined speed means the low-speed traveling state or the stopped state of the moving body. For example, regarding the vehicle, in the low-speed traveling state such as a traffic jam, the dilution of the odorant by the travel wind cannot be expected, but by reducing the flow rate of the anode off-gas, the discharge amount of the odorant included in the anode off-gas can be reduced to such a degree that a third person outside the vehicle does not feel smell. Further, when the vehicle is in the stopped state, the dilution of the odorant by the travel wind is hardly expected, but by completely shutting off the flow of the anode off-gas, the odorant can be prevented from being discharged to the outside of the vehicle.

In the fuel cell system according to the present invention having the above-mentioned structure, when the moving body is in the stopped state or the low-speed traveling state, the discharge amount of the odorant included in the anode off-gas to the outside of the moving body can be reduced. That is, even in a case where the dilution by the airflow around the moving body with respect to the moving body cannot be performed sufficiently such as when the moving body is in the stopped state or the low-speed traveling state, the discharge amount of the odorant to the outside of the moving body can be reduced, with the result that generation of smell can be reduced.

Further, the fuel cell system according to the present invention may further include: a hydrogen gas supply path through which a hydrogen gas supplied to the anode side of the fuel cell flow; and hydrogen gas pressure adjusting portion which raises a pressure of the hydrogen gas in the hydrogen gas supply path when the anode off-gas flow rate adjusting portion which shuts off the flow of the anode off-gas or reduces the flow rate of the anode off-gas.

The hydrogen gas pressure adjusting portion can raise the pressure of the hydrogen gas in the hydrogen gas supply path, thereby making it possible to suppress reduction in hydrogen concentration in the fuel cell. In general, with passage of time, the hydrogen concentration on the anode side in the fuel cell is gradually reduced. This is because nitrogen permeates through a membrane provided between the anode side and the cathode side to enter the anode side, and the nitrogen permeating through the membrane remains on the anode side. This phenomenon is expected to be conspicuous in a case where the flow of the anode off-gas is shut off, for example, by the anode off-gas flow rate adjusting portion. This is because by, for example, shutting off the flow of the anode off-gas, a circulation efficiency of the anode off-gas is reduced and the nitrogen permeating through the membrane is gradually accumulated in the fuel cell. However, in the fuel cell system according to the present invention, a relative pressure of the nitrogen can be suppressed by raising a pressure on the anode side, thereby making it possible to suppress the reduction in the hydrogen concentration in the fuel cell.

Note that, in a case where the pressure of the hydrogen gas is raised by the hydrogen gas pressure adjusting potion, it is preferable that a pressure of the hydrogen gas be larger than a pressure of the oxidation gas supplied to the cathode side. This is because, by making the pressure of the hydrogen gas larger than the pressure of the oxidation gas, the pressure on the anode side in the fuel cell can be made larger than a pressure on the cathode side. As a result, it is possible to effectively suppress permeation of the nitrogen from the cathode side to the anode side.

Further, the fuel cell system according to the present invention further includes: an anode off-gas circulation path branching off from the anode off-gas path, for guiding the anode off-gas flowing through the anode off-gas path to the fuel cell again as a circulation gas; and circulation gas flow rate adjusting portion which increases a circulation flow rate of the circulation gas when the anode off-gas flow rate adjusting portion which shuts off the flow of the anode off-gas or reduces the flow rate of the anode off-gas.

By increasing the flow rate of the circulation gas by the circulation gas flow rate adjusting portion, it is possible to diffuse the nitrogen or the like remaining on the anode side. As a result, the nitrogen remains on the anode side, thereby making it possible to solve a problem in that even though the hydrogen concentration in the hydrogen gas supply path is sufficient, the hydrogen concentration is not sufficient on the anode side in the fuel cell. Further, by providing the anode off-gas circulation path, the effective power generation can be performed.

In this case, by providing the physical adsorbent such as activated carbon to the fuel cell system, the odorant included in the exhaust air can be adsorbed. However, when the vehicle travels at a speed lower than the predetermined speed, the dilution by the travel wind cannot be performed sufficiently. Accordingly, it is preferable that the adsorption property of the odorant adsorbing portion which adsorbs the odorant included in the anode off-gas can be reproduced and generation of smell can be suppressed by adjusting a timing of discharging the adsorbed odorant. In this case, the fuel cell system according to the present invention may be mounted to a vehicle serving as a moving body and may include: a fuel cell which generates electric power by electrochemically reacting a hydrogen gas with an oxidation gas; odorant adsorbing portion which adsorbs an odorant included in an anode off-gas discharged from an anode side of the fuel cell by physical adsorption; reproduction portion which reproduces adsorption property of the odorant adsorbing portion by releasing the odorant adsorbed by the odorant adsorbing portion through adjustment of temperature of the odorant adsorbing portion; judgment portion which judges whether a state is suitable for reproduction of the adsorption property of the odorant adsorbing portion by the reproduction portion based on vehicle state information; and inhibition portion inhibiting the reproduction of the adsorption property by the reproduction portion in a case where the judgment portion judges that the state is not suitable for the reproduction by the reproduction portion.

The fuel cell performs the power generation by electrochemically reacting the hydrogen gas with the oxidation gas. Addition of the odorant to the hydrogen gas (fuel gas) enables detection of the leakage of the hydrogen gas. The hydrogen gas added with the odorant is supplied to the anode side of the fuel cell, and the anode off-gas including the odorant is discharged from the anode side. The anode off-gas discharged from the anode side is finally discharged to the outside of the vehicle.

The odorant included in the anode off-gas can be adsorbed by physical adsorption of the odorant adsorbing portion. The physical adsorption means adsorption resulting from a van der Waals force. The adsorption means a phenomenon in which a gaseous molecule rests in the vicinity of a surface of a liquid or a solid body. Further, the odorant adsorbing portion of the present invention can release the odorant, which is adsorbed by the physical adsorption, by adjusting temperature of the odorant adsorbing portion. As a result, the adsorption property of the odorant adsorbing portion can be reproduced. Note that, switching between the adsorption and releasing of the odorant can be performed by raising or lowering the temperature of the odorant adsorbing portion, for example. As described above, the odorant adsorbing portion according to the present invention is characterized by having a temperature region in which it is difficult to release the adsorbed odorant and a temperature region in which it is easy to release the adsorbed odorant. Note that, a low temperature can be an example of a temperature in the temperature region in which it is difficult to release the odorant and a high temperature can be an example of a temperature in the temperature region in which it is easy to release the odorant.

The reproduction portion can reproduce the adsorption property of the odorant adsorbing portion. However, by constantly making a reproduction state, that is, a state where the adsorbed odorant is released, smell is generated, for example, in a case where the released odorant is not sufficiently diluted by the travel wind or the like. As a countermeasure for this, the fuel cell system according to the present invention includes the judgment portion judges whether or not the state is suitable for the reproduction of the adsorption property of the odorant adsorbing portion by the reproduction portion based on vehicle state information, and the inhibition portion inhibits the reproduction by the reproduction portion based on a judgment result obtained by the judgment portion.

The reproduction portion can reproduce the adsorption property of the odorant adsorbing portion by releasing the odorant by setting the temperature of the odorant adsorbing portion in the temperature region in which it is easy to release the adsorbed odorant. The judgement portion judges whether or not the state is suitable for the reproduction of the adsorption property of the odorant adsorbing portion by the reproduction portion based on the vehicle state information of the vehicle on which the fuel cell system is mounted. The vehicle state information means information from the vehicle on which the fuel cell is mounted and the information on the state of the vehicle related to the releasing of the odorant by the reproduction. Further, the inhibition portion can inhibit the reproduction of the adsorption property of the odorant adsorbing portion by suppressing releasing of the odorant by setting the temperature in the temperature region in which it is difficult to release the odorant adsorbed by the odorant adsorbing portion.

According to the fuel cell system of the present invention as described above, the provision of the odorant adsorbing portion enables adsorption of the odorant, and the provision of the reproduction portion enables reproduction of the adsorption property of the odorant adsorbing portion. Further, the provision of the judgment portion and the inhibition portion enables control of the timing of releasing the odorant from the odorant adsorbing portion and suppression of generation of smell.

Further, in the fuel cell system according to the present invention, the vehicle state information includes speed information of the vehicle, and the judgment portion may judge that the state is not suitable for the reproduction of the adsorption property of the odorant adsorbing portion by the reproduction portion in a case where the speed of the vehicle is lower than the predetermined speed.

The speed information is information related to a current speed of the vehicle and can be obtained by using a speed sensor, for example. For example, the dilution by the travel wind depends on the speed of the vehicle, so by obtaining the speed information, it is possible to easily judge whether or not the dilution by the travel wind can be sufficiently performed. The predetermined speed is a speed at which the dilution by the travel wind cannot be expected and can be appropriately set. When the adsorption property of the odorant adsorbing portion is reproduced in the case where the dilution by the travel wind is not sufficiently performed, the odorant released from the odorant adsorbing portion is not diluted by the travel wind, thereby generating smell. However, the judgment portion judges that the state is not suitable for the reproduction based on the speed information, thereby making it possible to solve the problem.

Further, the fuel cell system according to the present invention further includes dilution portion arranged on an upstream side of the odorant adsorbing portion in a flow of the anode off-gas, for diluting an odorant included in the anode off-gas by guiding a cathode off-gas discharged from the fuel cell to the dilution portion. In the fuel cell system: the vehicle state information includes output information of the fuel cell mounted to the vehicle; and the judgment portion judges that the state is not suitable for the reproduction of the adsorption property of the odorant absorbing portion by the reproduction portion in a case where an output of the fuel cell is lower than a predetermined output.

The dilution portion can dilute the odorant included in the anode off-gas. However, when the output of the fuel cell is low, the flow rate of the cathode off-gas is also low, so it is thought that the odorant included in the anode off-gas cannot be diluted sufficiently. Therefore, in this case, it is preferable that the odorant included in the anode off-gas be adsorbed by the odorant adsorbing portion arranged on a downstream side with respect to the dilution portion. In the fuel cell system according to the present invention, when the output of the fuel cell is lower than the predetermined output, the reproduction of the odorant adsorption property by the reproduction portion is inhibited by the inhibition portion. When the reproduction of the adsorption property is inhibited, the temperature is set in the temperature region in which it is easy for the odorant adsorbing portion to adsorb the odorant, and the odorant can be effectively adsorbed, thereby suppressing the odorant discharged to the outside of the vehicle. Note that, the predetermined output is a predetermined electric output value of the fuel cell and can be set to an electric output value at which, by guiding the cathode off-gas discharged from the fuel cell to the dilution portion, the dilution of the odorant included in the anode off-gas can be sufficiently performed.

Further, in the fuel cell system according to the present invention, in the case where the judgment portion judges that the state is not suitable for the reproduction of the adsorption property of the odorant adsorbing portion by the reproduction portion, the inhibition portion may allow the temperature of the odorant adsorbing portion to be lowered to a predetermined temperature.

The predetermined temperature is a temperature at which the odorant adsorbing portion does not release the adsorbed odorant and can be appropriately set according to physical property of the odorant adsorbing portion. The inhibition portion allows the temperature of the odorant adsorbing portion to be lowered to the predetermined temperature, thereby suppressing the discharge of the odorant from the odorant adsorbing portion. As a result, it is possible to suppress the odorant discharged to the outside of the vehicle.

Further, the fuel cell system according to the present invention further includes cooling air supply portion supplies cooling air to the odorant adsorbing portion. In the fuel cell system, in the case where the judgment portion judges that the state is not suitable for the reproduction of the adsorption property of the odorant adsorbing portion by the reproduction portion, the inhibition portion supplies the cooling air from the cooling air supply portion to the odorant adsorbing portion. As a result, the temperature of the odorant adsorbing portion can be lowered.

Note that, in the fuel cell system according to the present invention, when the judgment portion judges that the state is suitable for the reproduction of the adsorption property of the odorant adsorbing portion by the reproduction portion, the temperature of the odorant adsorbing portion can be increased. As a result, the adsorption property of the odorant adsorbing portion can be reproduced more effectively. Note that, to raise the temperature of the odorant adsorption means to raise the temperature to be higher than the temperature in the normal state. The normal state is a state in which the temperature of the odorant adsorbing portion is at an average in a case where the fuel cell is operated. Heating of the odorant adsorbing portion can be performed by heat supply portion supplying heat, for example. Note that, the heat supply portion may be arranged so as to cover the odorant adsorbing portion, or may be arranged on the upstream side of the odorant adsorbing portion.

According to the present invention, it is possible to provide a technology related to the fuel cell system capable of adjusting the discharge amount of the odorant discharged to the outside of the moving body according to the state of the moving body.

BRIEF DESCRIPTION OF THE DRAWINGS

In the accompanying drawings:

FIG. 1 is a diagram showing a structure of a fuel cell system according to a first embodiment of the present invention;

DETAILED DESCRIPTION OF THE PREFERRED EMBODIMENTS

Figure 2:
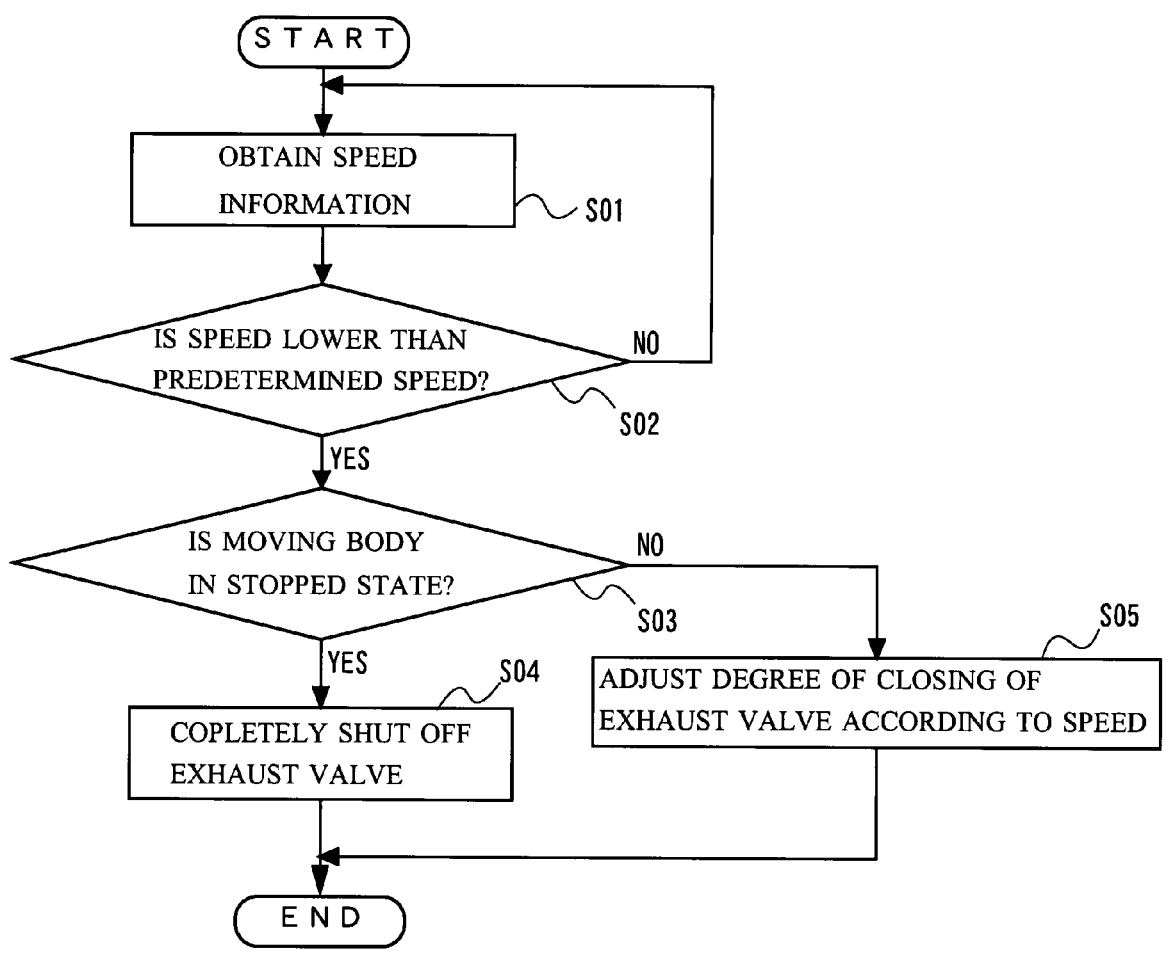
FIG. 2 is a flow chart showing control for reducing an odorant discharged to an outside of a vehicle.

Next, a description will be made of embodiments of a fuel cell system according to the present invention with reference to the drawings.

First Embodiment

FIG. 1 is a diagram showing a structure of a fuel cell system according to a first embodiment of the present invention. As shown in FIG. 1, the fuel cell system according to the first embodiment of the present invention includes a fuel cell 10, a hydrogen gas supply path 21 through which a hydrogen gas flows to be supplied to an anode side of the fuel cell 10, an anode off-gas path 22 through which an anode off-gas discharged from the anode side of the fuel cell 10 flows, an oxidation gas supply path 24 through which air including an oxidation gas to be supplied to a cathode side of the fuel cell 10 flows, a cathode off-gas path 25 through which a cathode off-gas discharged from the cathode side of the fuel cell 10 flows, an exhaust valve 30 for shutting off flow of the anode off-gas or adjusting flow rate of the anode off-gas, an electronic control unit (ECU) 50 for performing electronic control of various devices of a vehicle 1, and a speed sensor 60 for detecting speed of the vehicle 1. Note that, the fuel cell system according to this embodiment is mounted to the vehicle 1 and the fuel cell 10 functions as a drive source of the vehicle 1. Further, arrows shown in the drawings each indicate flow of a gas flowing through the fuel cell system.

The fuel cell 10 may be a polymer electrolyte fuel cell which is relatively small and is superior in power generation efficiency. The fuel cell 10 generates electric power by electrochemically reacting a hydrogen gas supplied to the anode side through the hydrogen gas supply path 21 with an oxidation gas supplied to the fuel cell 10 through the oxidation gas supply path 24.

The hydrogen gas supply path 21 has one end connected to a hydrogen gas supply device (not shown) and another end connected to the fuel cell 10 to guide the hydrogen gas supplied by the hydrogen gas supply device to the fuel cell 10. Further, the hydrogen gas supply path 21 is provided with a shut off valve 31 for shutting off supply of the hydrogen gas.

The anode off-gas path 22 has one end connected to the fuel cell 10 and another end released to the outside of the vehicle 1 to guide the anode off-gas discharged from the anode side of the fuel cell 10 to the outside of the vehicle 1. Further, the anode off-gas path 22 is provided with the exhaust valve 30 and a dilution tank 35 in the stated order from an upstream side. Further, the exhaust valve 30 is connected to the ECU 50 for performing electronic control of the exhaust valve 30.

The ECU 50 is electrically connected to the exhaust valve 30 and the speed sensor 60. Based on speed information detected by the speed sensor 60, the ECU 50 controls opening and closing of the exhaust valve 30. The ECU 50 corresponds to anode off-gas flow rate adjusting portion of the present invention. That is, when it is judged that the vehicle 1 on which the fuel cell system is mounted is in a stopped state, the ECU 50 allows the exhaust valve 30 to be completely closed, thereby shutting off flow of the anode off-gas. Further, when it is judged that the vehicle 1 is in a low-speed traveling state, the ECU 50 allows the exhaust valve 30 to be closed by a predetermined ratio, thereby reducing flow rate of the anode off-gas.

The oxidation gas supply path 24 guides the air taken in from the one end thereof to the fuel cell 10 connected to the other end thereof. Further, the oxidation gas supply path 24 has a compressor 36, so the oxidation gas supply path 24 can supply the taken air to the fuel cell 10 with the air being compressed. Further, the oxidation gas supply path 24 is provided with a bypass path 26 branching off from a midpoint of the oxidation gas supply path 24. A terminal end of the bypass path 26 is connected to the dilution tank 35.

The cathode off-gas path 25 has one end connected to the fuel cell 10 and another end connected to the dilution tank 35. The cathode off-gas path 25 is joined to the anode off-gas path 22 on a downstream side of the dilution tank 35. Further, the cathode off-gas path 25 has a back pressure control valve 37 provided on an upstream side of the dilution tank 35.

Next, a description will be made of control for reducing a discharge amount of the odorant to the outside of the vehicle 1 by the fuel cell system according to the first embodiment of the present invention. Note that, the control described below is performed by the ECU 50. FIG. 2 is a flow chart showing the control for reducing the odorant discharged to the outside of the vehicle 1.

In Step S01, the ECU 50 obtains speed information by using the speed sensor 60 when the power generation of the fuel cell 10 starts. Note that, the speed information is speed of the vehicle 1 on which the fuel cell system is mounted.

In Step S02, the ECU 50 judges whether or not the speed of the vehicle 1 is lower than a predetermined speed. The predetermined speed can be appropriately set to a speed at which dilution by airflow around a moving body with respect to the moving body, for example, travel wind cannot be expected. For example, a speed of 15 km per hour which is referred to as low-speed traveling speed can be set to the predetermined speed. When it is judged that the speed of the vehicle 1 is lower than the predetermined speed, an operation of the ECU 50 proceeds to Step S03. On the other hand, when it is judged that the speed of the vehicle 1 is lower than the predetermined speed, the ECU 50 performs the process of Step S01 again.

In Step S03, the ECU 50 judges whether or not the vehicle 1 is in the stopped state. The judgment of whether or not the vehicle 1 is in the stopped state can be made according to information obtained by a sensor of a side brake or information obtained by the speed sensor, for example. When it is judged that the vehicle 1 is in the stopped state, the ECU 50 allows the exhaust valve 30 to be completely shut off (Step S04).

On the other hand, when it is not judged that the vehicle is in the stopped state, the ECU 50 allows the exhaust valve 30 to be adjusted in its degree of closing such that the discharge amount of the odorant to the outside of the vehicle 1 is reduced when compared to a normal state (Step S05). The adjustment can be performed, for example, by determining a degree of dilution by the travel wind for each speed at the time of low-speed traveling and setting the ratio of opening and closing of the exhaust valve 30 such that the ratio corresponds to each speed at the time of low-speed traveling. Specifically, a table is provided in advance in which a ratio of opening and closing when a speed is equal to or higher than the predetermined speed, that is, when the odorant can be sufficiently diluted by the travel wind is 100, a ratio thereof when a speed is the low-speed traveling speed of 10 km per hour is 30, and a ratio thereof when a speed is 5 km per hour at which the dilution by the travel wind can be expected to a lower degree than when the speed is 10 km is 10. As a result, opening and closing of the exhaust valve 30 can easily be performed.

With the fuel cell system according to the first embodiment of the present invention as described above, in cases where the dilution by the travel wind cannot be expected like in the stopped state or the low-speed traveling state of the vehicle 1, the odorant discharged to the outside of the vehicle 1 can be reduced.

Second Embodiment

Next, a description will be made of a fuel cell system according to a second embodiment of the present invention.

Figure 3:
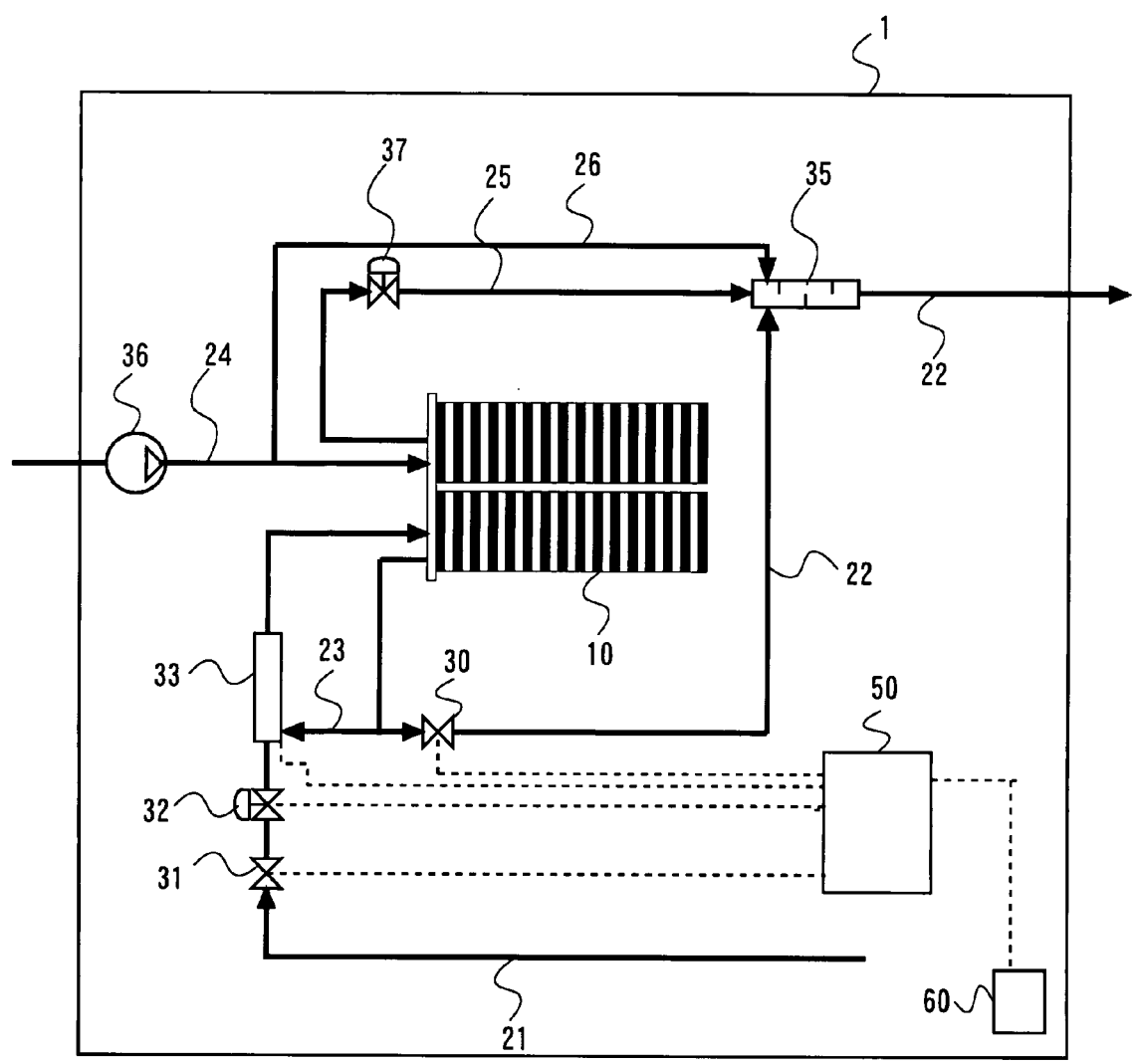
FIG. 3 is a diagram showing structure of a fuel cell system according to a second embodiment of the present invention.

FIG. 3 is a diagram showing a structure of the fuel cell system according to the second embodiment of the present invention. As shown in FIG. 3, the fuel cell system according to the second embodiment of the present invention has a structure basically the same as that of the fuel cell system according to the first embodiment of the present invention. The fuel cell system according to the second embodiment is different from the fuel cell system according to the first embodiment in that the fuel cell system according to the second embodiment includes an anode off-gas circulation path 23, a variable pressure control valve 32, and a circulation device 33. Note that, the same components as those of the fuel cell system according to the first embodiment are denoted by the same reference numerals and detailed descriptions thereof will be omitted.

The anode off-gas circulation path 23 branches off from the anode off-gas path 22, and a part of the anode off-gas is guided again to the fuel cell 10 as a circulation gas. Note that, in this embodiment, in a mode of circulation, there is adopted a structure in which the anode off-gas circulation path 23 branching off from the anode off-gas path 22 is joined to the hydrogen gas supply path 21. However, this is not obligatory. There may be adopted a structure in which the anode off-gas circulation path 23 is not joined to the hydrogen gas supply path 21 but is directly connected to the fuel cell 10.

The variable pressure control valve 32 is provided to the hydrogen gas supply path 21 and is electrically connected to the ECU 50. The ECU 50 controls the variable pressure control valve 32, thereby adjusting the pressure of the hydrogen gas to be supplied to the fuel cell 10. Therefore, the ECU 50 also corresponds to hydrogen gas pressure adjusting portion in addition to the anode off-gas flow rate adjusting portion. Note that, in the fuel cell 10, nitrogen permeates from the cathode side. The nitrogen remains on the anode side, thereby causing hydrogen concentration on the anode side to gradually decrease with passage of time. This phenomenon becomes more conspicuous in a case where the exhaust valve 30 for shutting off the flow of the anode off-gas is completely closed. However, in the fuel cell system according to the second embodiment of the present invention, a pressure of the hydrogen gas is raised by the variable pressure control valve 32, thereby making it possible to suppress penetration of nitrogen through a membrane, so the reduction in the hydrogen concentration on the anode side can be suppressed. Note that, the increased pressure of the hydrogen gas is preferably larger than a pressure of the oxidation gas supplied to the cathode side.

Figure 4:
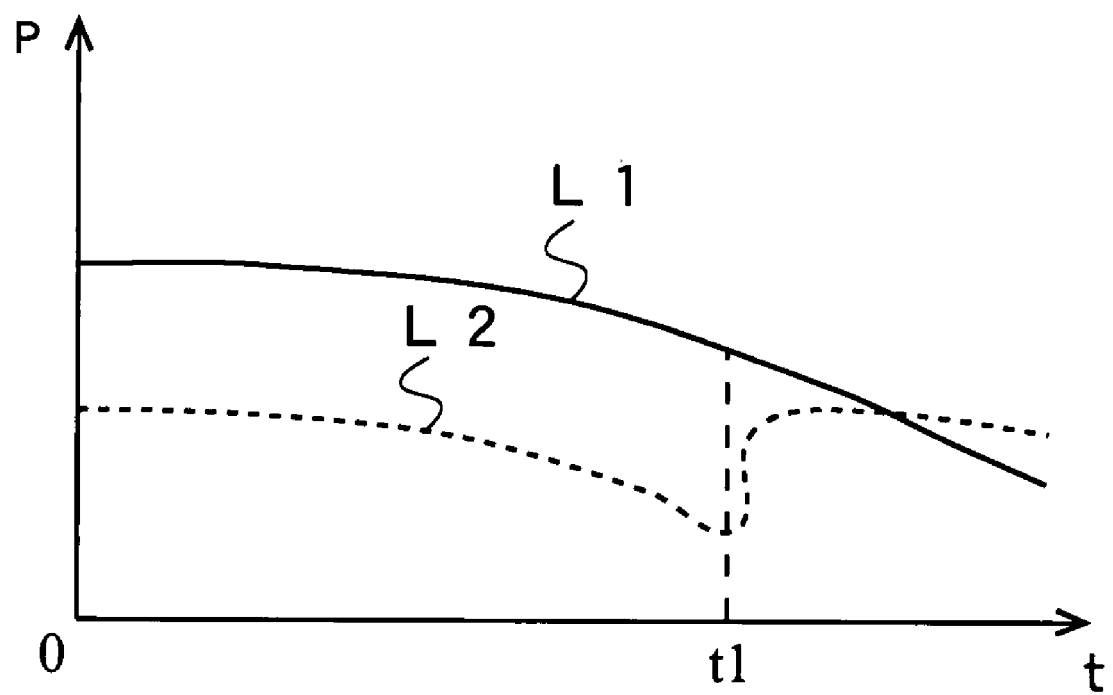
FIG. 4 is a graph showing a comparison between pressure reduction curves.

Note that, the pressure of the hydrogen gas supplied to the fuel cell 10 is set to be relatively higher than that in a conventional technique. As a result, in a case where the power generation is performed by the circulation gas, it is possible to elongate a time period to cause the hydrogen concentration of the circulation gas required for the power generation to be lower than a predetermined value. FIG. 4 is a graph showing a comparison between pressure reduction curves. Specifically, the graph shows the pressure reduction curves when the power generation is performed by the circulation gas in cases where the pressure of the hydrogen gas is raised by the variable pressure control valve 32 and where the pressure of the hydrogen gas is not raised thereby. An axis of ordinate represents pressure and an axis of abscissa represents time. A solid line L1 shows a case where the pressure of the hydrogen gas is raised and a dotted line L2 shows a case where the pressure of the hydrogen gas is not raised. As shown in FIG. 4, the pressure of the hydrogen gas is reduced with the passage of time like the hydrogen concentration in the fuel cell 10. However, as indicated by the dotted line L2, the hydrogen gas supplied without the pressure thereof being raised has a pressure lower than the pressure required for the power generation at a time t1. On the other hand, as indicated by the solid line L1, the hydrogen gas supplied with the pressure thereof being raised still retains a sufficient pressure at the time t1. That is, FIG. 4 shows that the hydrogen gas supplied with the pressure thereof being raised has a hydrogen concentration sufficient for the power generation at the time t1. As described above, according to the present invention, by raising the pressure of the hydrogen gas to be supplied, the hydrogen concentration required for the power generation can be maintained for a longer time than in the conventional technique.

With reference to FIG. 3 again, a further description will be made of the structure of the fuel cell. The circulation device 33 is arranged on the downstream side of the variable pressure control valve 32 and is electrically connected to the ECU 50. The ECU 50 controls the circulation device 33, thereby adjusting the flow rate of the circulation gas supplied again to the fuel cell 10 as the circulation gas. Therefore, the ECU 50 also corresponds to circulation gas flow rate adjusting portion in addition to the anode off-gas flow rate adjusting portion and the hydrogen gas pressure adjusting portion of the present invention. By increasing the flow rate of the circulation gas, that is, the circulation gas amount flowing per time unit, the nitrogen remaining in the fuel cell 10 can be diffused. Thus, it is possible to solve a problem of reduction in the hydrogen concentration on the anode side of the fuel cell 10.

Figure 5:
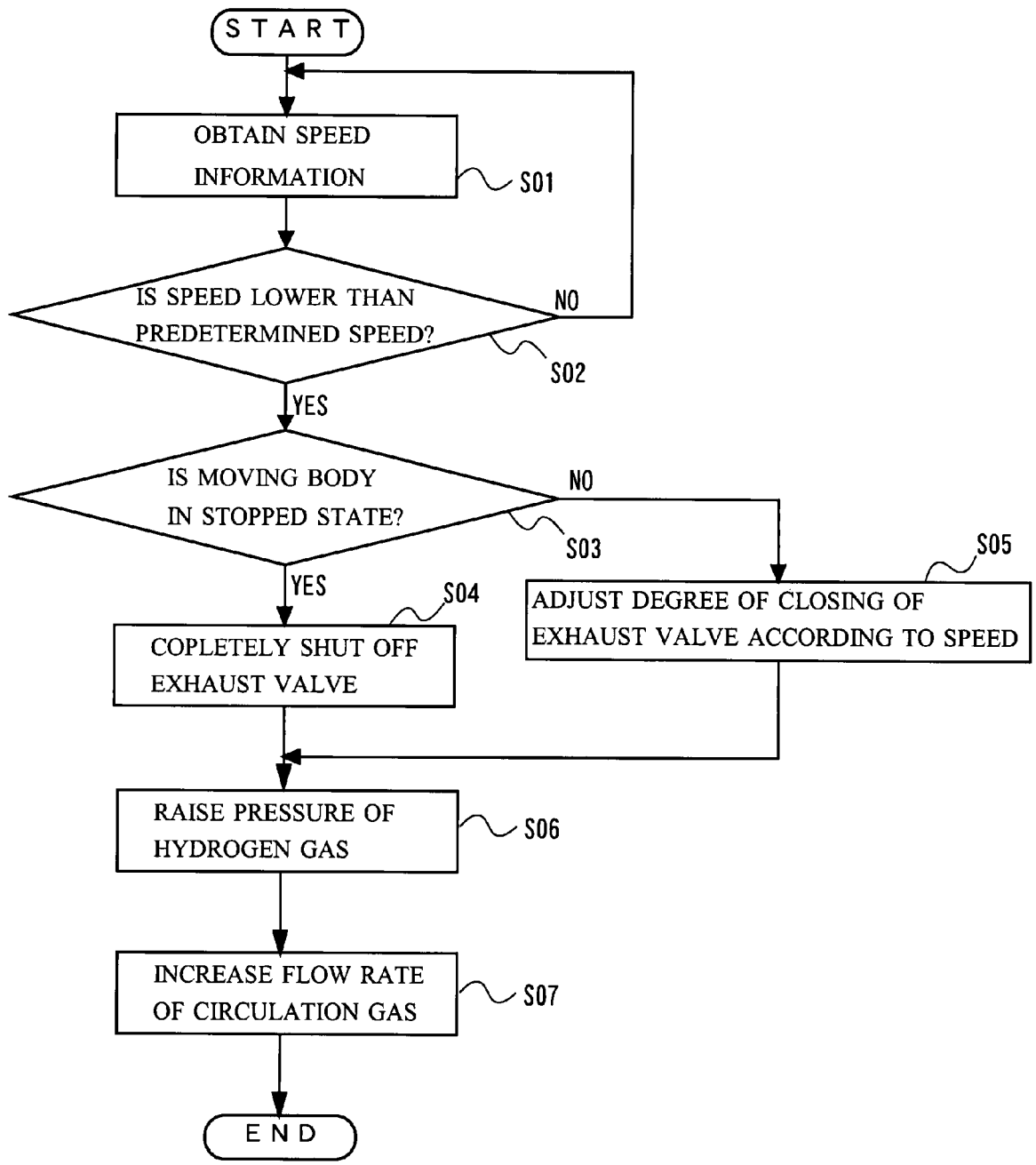
FIG. 5 is a flow chart showing control for reducing an odorant discharged to an outside of a vehicle by the fuel cell system according to the second embodiment of the present invention.

Next, a description will be made of control for reducing the discharge amount of the odorant to the outside of the vehicle 1 by the fuel cell system according to the second embodiment of the present invention, the control further including a pressure control of the hydrogen gas and a flow rate control of the circulation gas. Note that, the control described below is performed by the ECU 50. FIG. 5 is a flow chart showing the control for reducing the discharge amount of the odorant to the outside of the vehicle 1, the control further including the pressure control of the hydrogen gas and the flow rate control of the circulation gas.

The ECU 50 performs the processes from Step S01 to Step S05 described in the first embodiment of the present invention. Next, the ECU 50 raises the pressure of the hydrogen gas supplied to the fuel cell 10 by the variable pressure control valve 32 (Step S06). Further, the ECU 50 allows the flow rate of the circulation gas to be increased by the circulation device 33 (Step S07).

With the fuel cell system according to the second embodiment of the present invention as described above, when the dilution by the travel wind cannot be expected like in the case where the vehicle 1 is in the stopped state or in the low-speed traveling state, it is possible to reduce the discharge amount of the odorant to the outside of the vehicle 1, to suppress reduction in the hydrogen concentration in the fuel cell 10, and to diffuse the nitrogen remaining in the fuel cell 10. Note that, in the second embodiment, after the pressure control of the hydrogen gas is performed, the flow rate control of the circulation gas is performed. However, this is not obligatory. The pressure control of the hydrogen gas may be performed after performing the flow rate control of the circulation gas, or only one of those controls may be performed.

Third Embodiment

Figure 6:
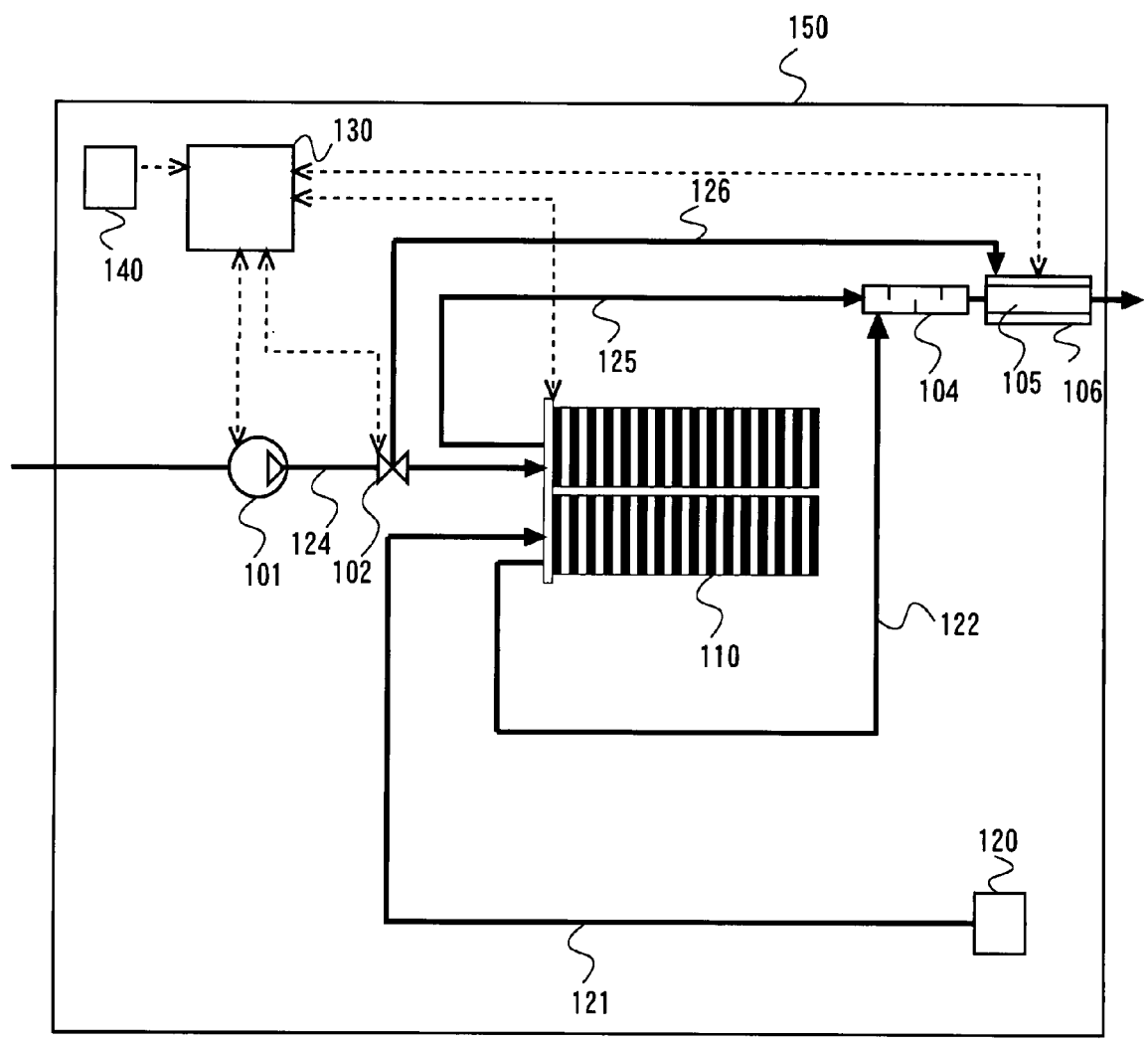
FIG. 6 is a diagram showing a structure of a fuel cell system according to a third embodiment of the present invention.

FIG. 6 is a diagram showing a structure of a fuel cell system according to a third embodiment of the present invention. Note that, the fuel cell system according to this embodiment is mounted to a vehicle 150. As shown in FIG. 6, the fuel cell system according to the third embodiment of the present invention includes a fuel cell 110, a hydrogen gas supply device 120, a hydrogen gas supply path 121, an anode off-gas path 122, an oxidation gas supply path 124, a cathode off-gas path 125, an electronic control unit (ECU) 130, a speed sensor 140, a compressor 101, a bypass path 126, a switching valve 102, a dilution tank 104, an activated carbon 105, and an electric heater 106. Note that, solid arrows of FIG. 6 each indicate flow of a gas flowing through the fuel cell system.

The fuel cell 110 may be a polymer electrolyte fuel cell which is relatively small and superior in power generation efficiency. The fuel cell 110 performs power generation by electrochemically reacting a hydrogen gas supplied to an anode side through the hydrogen gas supply path 121 with an oxidation gas supplied to the fuel cell 110 through the oxidation gas supply path 124. An electric energy obtained by the power generation is transmitted to a drive portion of the vehicle 150, thereby enabling traveling of the vehicle 150.

The hydrogen gas supply path 121 has one end connected to the hydrogen gas supply device 120 and another end connected to the fuel cell 110 to guide the hydrogen gas mixed with an odorant supplied by the hydrogen gas supply device 120 to the fuel cell 110.

The anode off-gas path 122 has one end connected to the fuel cell 110 and another end released to the outside of the vehicle 150 to guide an anode off-gas discharged from the anode side of the fuel cell 110 to the outside of the vehicle 150. Further, the anode off-gas path 122 is provided with, from an upstream side of a flow of the anode off-gas, the dilution tank 104 and the activated carbon 105 in the stated order.

The oxidation gas supply path 124 guides air taken in from the one end thereof to the fuel cell 110 connected to the other end thereof. Further, the oxidation gas supply path 124 is provided with the compressor 101, so the air taken in can be supplied to the fuel cell 110 while being compressed. Further, the oxidation gas supply path 124 is provided with the bypass path 126 branching off therefrom. A terminal end of the bypass path 126 is connected to the activated carbon 105.

The cathode off-gas path 125 has one end connected to the fuel cell 110 and another end connected to the dilution tank 104 to guide a cathode off-gas discharged from a cathode side of the fuel cell 110 to the dilution tank 104.

The compressor 101 compresses the air taken in from the one end of the oxidation gas supply path 124 to supply the air to the fuel cell 110, and supplies air for cooling the activated carbon 105 to the activated carbon 105. The bypass path 126 directly guides to the activated carbon 105 the air for cooling supplied by the compressor 101. The switching valve 102 switches the path through which the air flows, under the control of the ECU 130. Note that, the compressor 101 and the bypass path 126 correspond to cooling air supply portion of the present invention.

The dilution tank 104 dilutes the odorant included in the anode off-gas and corresponds to the dilution portion of the present invention. By taking the cathode off-gas to the dilution tank 104, the odorant included in the anode off-gas can be diluted. Note that, the dilution tank 104 may take in air from the outside to mix the air with the anode off-gas, thereby performing the dilution.

The activated carbon 105 is arranged on the downstream side of the dilution tank 104, adsorbs the odorant included in the anode off-gas, and corresponds to odorant adsorbing portion of the present invention. The activated carbon 105 has characteristics in which it is difficult to release the adsorbed odorant in a low-temperature region, and in which it is easy to release the odorant in a high temperature region. Note that, in place of the activated carbon 105, a porous material such as zeolite may be used.

Figure 7:
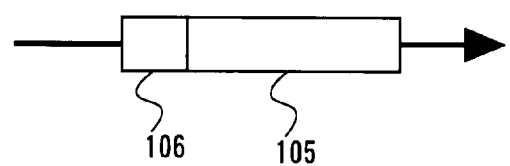
FIG. 7 is a diagram showing an example of an arrangement structure of an electric heater.

The electric heater 106 as heat supply portion supplies heat to the activated carbon 105. Note that, in this embodiment, the electric heater 106 is arranged so as to cover the activated carbon 105, thereby effectively heat the activated carbon 105 in a short period of time. Note that, the arrangement of the electric heater 106 is not limited to the arrangement described above. The electric heater 106 may be arranged in series on the upstream side of the activated carbon 105 (see FIG. 7). As a result, an arrangement space for the electric heater 106 can be reduced.

The ECU 130 corresponds to judgment portion of the present invention, is electrically connected to the speed sensor 140, and obtains speed information of the vehicle 150 from the speed sensor 140. Based on the obtained speed information, the ECU 130 judges whether or not a state is suitable for reproduction of the activated carbon 105. Specifically, in a case where a speed of the vehicle 150 is lower than a predetermined speed, so the odorant discharged to the outside of the vehicle 150 is not diluted to a sufficient degree, a judgment is made that the state is not suitable for the reproduction. Note that, the predetermined speed is a speed at which the dilution by the travel wind cannot be expected and may appropriately be set.

The ECU 130 is electrically connected to, in addition to the speed sensor 140, devices such as the compressor 101, the switching valve 102, the electric heater 106, and the fuel cell 110, and can control the devices connected thereto. For example, the ECU 130 switches the switching valve 102 when the speed detected by the speed sensor 140 is lower than the predetermined speed, and the ECU 130 directly guides the cooling air supplied by the compressor 101 to the activated carbon 105. In this manner, a temperature of the activated carbon 105 can be lowered and reproduction of adsorption property of the activated carbon 105 can be inhibited. Further, the ECU 130 may allow the temperature of the electric heater 106 to rise when the speed detected by the speed sensor 140 is equal to or higher than the predetermined speed. As a result, the reproduction of the adsorption property of the activated carbon 105 can be promoted. Therefore, the ECU 130 also corresponds to inhibition portion and reproduction portion.

Figure 8:
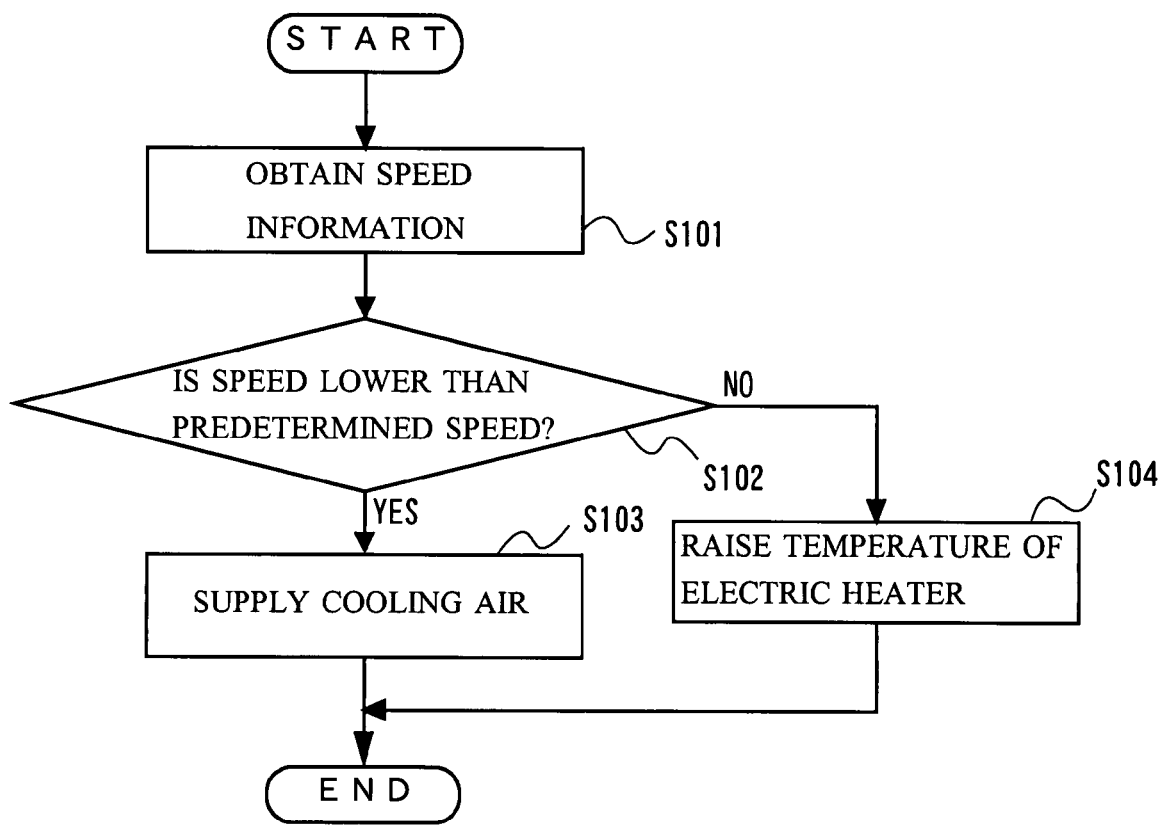
FIG. 8 is a flow chart showing control for adjusting temperature of activated carbon based on speed information.

Next, a description will be made of the control for adjusting temperature of the activated carbon 105 based on the speed information by the fuel cell system according to the third embodiment of the present invention. Note that, the control described below is performed by the ECU 130. FIG. 8 is a flow chart for showing the control for adjusting temperature of the activated carbon 105 based on the speed information.

In Step S101, the ECU 130 obtains the speed information from the speed sensor 140 when the power generation of the fuel cell 110 starts. Note that, the speed information is information on speed of the vehicle 150 on which the fuel cell system is mounted.

In Step S102, the ECU 130 judges whether or not the speed of the vehicle 150 is lower than the predetermined speed. When the ECU 130 judges that the speed of the vehicle 150 is lower than the predetermined speed, the ECU 130 judges that the state is not suitable for reproducing the adsorption property of the activated carbon 105 and the step proceeds to Step S103.

In Step S103, the ECU 130 starts supply of the cooling air. That is, the ECU 130 switches the switching valve 102 such that the cooling air is directly supplied to the activated carbon 105 through the bypass path 126. The temperature of the activated carbon 105 is lowered to a predetermined temperature by the cooling air. Note that, the predetermined temperature is a temperature at which the activated carbon 105 does not perform reproduction of the adsorption property, that is, the activated carbon 105 does not release the adsorbed odorant. The predetermined speed can appropriately be set according to physical properties of the activated carbon 105.

On the other hand, it is not judged that the speed of the vehicle 150 is lower than the predetermined speed, the ECU 130 judges that the state is suitable for reproducing the adsorption property of the activated carbon 105 and performs a process of Step S104. In Step S104, the ECU 130 increases the temperature of the activated carbon 105 by the electric heater 106.

Note that, adjustment of the temperature of the activated carbon 105 based on the speed information may be performed by providing a table in which flow rate of cooling air supplied and temperature of the electric heater 106 are set for each speed. Further, the temperature sensor for detecting the temperature of the activated carbon 105 is provided, and the ECU 130 may perform comparison operation using the speed of the vehicle 150 and the temperature of the activated carbon 105 to determine an optimum flow rate of the cooling air or to determine an optimum temperature of the electric heater 106, thereby performing the temperature control of the activated carbon 105.

Further, in Step S102, when the ECU 130 judges that the speed of the vehicle 150 is lower than the predetermined speed, the ECU 130 may further judge whether or not the vehicle 150 is in a stopped state. When the vehicle 150 is in the stopped state, it is judged that the dilution by the travel wind cannot be expected and the state is not suitable for reproduction of the adsorption property of the activated carbon 105, so the ECU 130 may cause the flow rate of the cooling air from the compressor 101 to be a maximum. On the other hand, in a case where the vehicle 150 is not in the stopped state, the ECU 130 may adjust the flow rate of the cooling air from the compressor 101 according to the speed of the vehicle 150.

With the fuel cell system according to the third embodiment of the present invention described above, the odorant included in the anode off-gas can be adsorbed by including the activated carbon 105. As a result, it is possible to suppress discharge of the odorant to the outside of the vehicle 150. Further, when the dilution by the travel wind cannot be expected like in the case where the vehicle 150 is in the stopped state or in the low-speed traveling state, the ECU 130 adjusts the temperature of the activated carbon 105 based on the speed information, thereby making it possible to suppress the discharge of the odorant to the outside of the vehicle 150 and to suppress generation of smell. Further, in a case where the vehicle 150 travels at a speed equal to or higher than the predetermined speed, so the dilution by the travel wind can be expected, release of the odorant adsorbed by raising the temperature of the activated carbon 105 can be promoted. Accordingly, the reproduction of the adsorption property of the activated carbon 105 can effectively performed.

Fourth Embodiment

Figure 9:
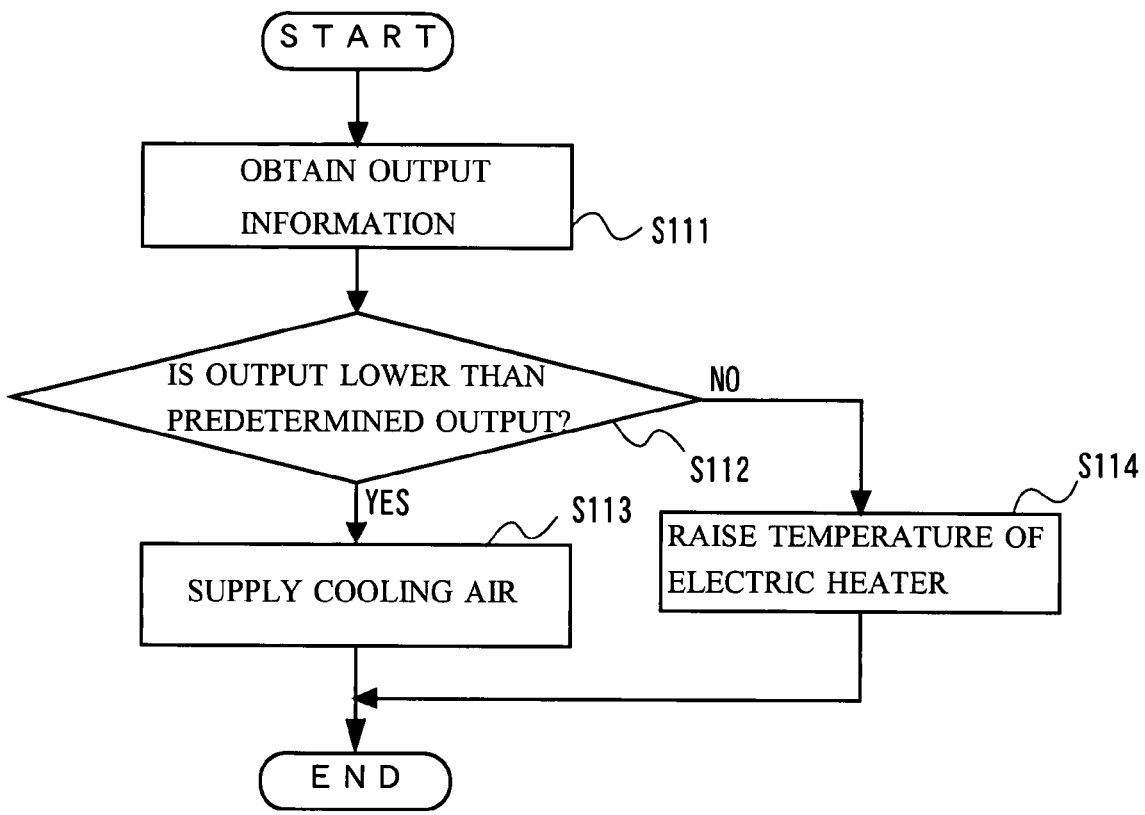
FIG. 9 is a flow chart showing control for adjusting the temperature of the activated carbon based on output information.

Next, a description will be made of a fuel cell system according to a fourth embodiment of the present invention. The fuel cell system according to the fourth embodiment of the present invention has the same structure as that of the fuel cell system according to the third embodiment of the present invention. The fuel cell system according to the fourth embodiment is different from the fuel cell system according to the third embodiment in that the ECU 130 adjusts the temperature of the activated carbon based on output information of the fuel cell 110. Therefore, a description of the structure will be omitted, and in the following, a description will be made of control for adjusting the temperature of the activated carbon 105 based on the output information of the fuel cell 110. FIG. 9 is a flow chart showing control for adjusting the temperature of the activated carbon 105 based on the output information. Note that, the control described below is performed by the ECU 130.

In Step S111, the ECU 130 obtains the output information of the fuel cell 110 from the fuel cell 110 when the power generation of the fuel cell 110 starts. Note that, the output information is an electrical output value obtained through the power generation of the fuel cell 110.

In Step S112, the ECU 130 judges whether or not the output of the fuel cell 110 is lower than a predetermined output. When it is judged that the output of the fuel cell 110 is lower than the predetermined output, the ECU 130 judges that the state is not suitable for reproducing the adsorption property of the activated carbon 105, and the process proceeds to Step S113. Note that, the predetermined output can be appropriately set to be the electrical output value sufficient for allowing the dilution of the odorant included in the anode off-gas to be performed by guiding the cathode off-gas discharged by the fuel cell 110 to the dilution tank 104.

In Step S113, the ECU 130 starts supply of the cooling air. That is, the ECU 130 switches the switching valve 102 such that the cooling air is directly supplied to the activated carbon 105 through the bypass path 126, and allows the temperature of the activated carbon 105 to be lowered to the predetermined temperature by the cooling air. On the other hand, when it is not judged that the output of the fuel cell 110 is lower than the predetermined output, the ECU 130 judges that the state is suitable for reproducing the adsorption property of the activated carbon 105, and the temperature of the activated carbon 105 is increased by the electric heater 106 (Step S114).

In the fuel cell system according to the fourth embodiment of the present invention described above, it is possible to suppress discharge of the odorant to the outside of the vehicle 150 by adsorbing the odorant included in the anode off-gas by the activated carbon 105. Further, when the sufficient dilution by the cathode off-gas cannot be expected because the output of the fuel cell 110 is low, the ECU 130 adjusts the temperature of the activated carbon 105 based on the output information of the fuel cell 110, thereby inhibiting the reproduction of the activated carbon 105. As a result, the odorant included in the anode off-gas can effectively be adsorbed by the activated carbon 105. Therefore, the odorant discharged to the outside of the vehicle 150 is suppressed, so generation of the smell can be suppressed. Further, in a case where the output of the fuel cell 110 is high, so the sufficient dilution can be performed by the cathode off-gas discharged by the fuel cell 110, it is possible to promote releasing of the odorant adsorbed by raising the temperature of the activated carbon 105 by the electric heater 106. Thus, reproduction of the adsorption property of the activated carbon 105 can effectively be performed.

Further, the description has been made of the preferred embodiments of the present invention. However, the fuel cell system according to the present invention is not limited to those, but can include combinations of those as many as possible. For example, in the fuel cell system according to the second embodiment of the present invention, the pressure control of the hydrogen gas and the flow rate control of the circulation gas may be performed by providing a hydrogen concentration sensor to the fuel cell and according to hydrogen concentration detected by the hydrogen concentration sensor. Further, in the third embodiment as described above, the cases where the adjustment of the temperature of the activated carbon 105 is performed based on the speed information and where the adjustment thereof is performed based on the output information are described in different embodiments. However, the present invention is not limited to those embodiments, but the ECU 130 may adjust the temperature of the activated carbon 105 based on the speed information and the output information.

What is claimed is:

1. A fuel cell system mounted to a vehicle serving as a moving body, comprising:
   a fuel cell which generates electric power by electrochemically reacting a hydrogen gas with an oxidation gas;
   odorant adsorbing portion, downstream of the fuel cell, which adsorbs an odorant included in an anode off-gas discharged from an anode side of the fuel cell by physical adsorption;
   reproduction portion which reproduces adsorption property of the odorant adsorbing portion by releasing the odorant adsorbed by the odorant adsorbing portion through adjustment of temperature of the odorant adsorbing portion;
   judgment portion which judges whether a state is suitable for reproduction of the adsorption property of the odorant adsorbing portion by the reproduction portion based on speed information of the vehicle; and
   inhibition portion which inhibits the reproduction of the adsorption property by the reproduction portion in a case where the judgment portion judges, based on the speed information of the vehicle, that the state is not suitable for the reproduction by the reproduction portion.

2. A fuel cell system according to claim 1, wherein:
   the judgment portion judges that the state is not suitable for the reproduction of the adsorption property of the odorant adsorbing portion by the reproduction portion in a case where a speed of the vehicle is lower than a predetermined speed.

3. A fuel cell system according to claim 1, wherein, in the case where the judgment portion judges that the state is not suitable for the reproduction of the adsorption property of the odorant adsorbing portion by the reproduction portion, the inhibition portion allows the temperature of the odorant adsorbing portion to be lowered to a predetermined temperature.

4. A fuel cell system according to claim 1, further comprising cooling air supply portion which supplies cooling air to the odorant adsorbing portion,
   wherein, in the case where the judgment portion judges that the state is not suitable for the reproduction of the adsorption property of the odorant adsorbing portion by the reproduction portion, the inhibition portion supplies the cooling air from the cooling air supply portion to the odorant adsorbing portion.

* * * * *